United States Patent Office 3,115,355
Patented Dec. 24, 1963

3,115,355
VALVE SPRING COLLAR LOCATING DEVICES
Joseph Hugh Stott Gardner, Worsley, England, assignor to L. Gardner & Sons Limited, Manchester, England, a British company
Filed May 28, 1962, Ser. No. 198,287
Claims priority, application Great Britain June 21, 1961
1 Claim. (Cl. 287—52.08)

This invention relates to means for locating a collar in a predetermined position or angular relationship on an internal combustion engine valve stem.

According to the invention, the device consists of a parallel pin, passing through a fitting hole in the valve stem and having projecting ends engaging slots in a boss, formed on the exposed face of the collar, the pin being retained in position by one or more spring rings or circlips sprung into a circumferential groove around the boss.

The collar may be located longitudinally on the valve stem by a screw thread or by any other convenient means. The depth of the slots in the boss on the collar is sufficient to allow for axial displacement of the screw threads or other means, in relation to the position of the hole in the stem.

When it is necessary to locate a valve in a particular angular position, as in the case of an internal combustion engine inlet valve having a shroud incorporated in the head, the collar may engage with suitable guide surfaces, the hole being in designed angular relation to the shroud and correct assembly assured by the hole and grooves being offset from the centreline of the valve stem.

This device permits use of a solid pin, having the following advantages:
 (a) Greater strength than a split pin.
 (b) The pin may be made of material of higher tensile strength and mechanical properties than are obtainable in materials suitable for the manufacture of split pins.
 (c) The weight of the pin in accordance is less than that of a conventional split pin, resulting in operation at a lesser rate of wear of the pin and associated components.
 (d) The solid pin may be made more truly cylindrical and to closer dimensional accuracy than a split pin, so securing minimum clearance in assembly, which contributes to a low rate of wear.

Figure 2:
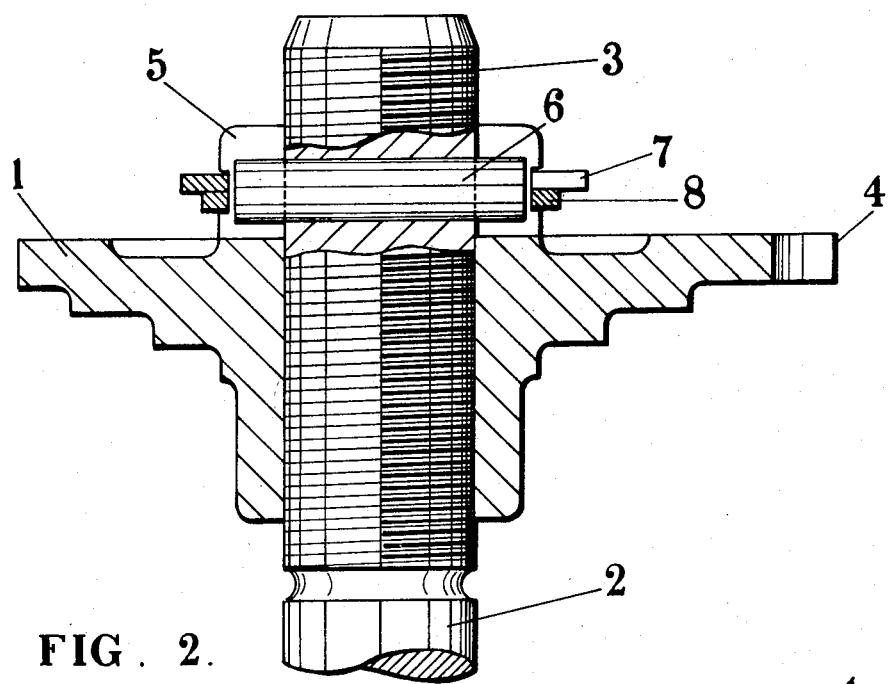
Figure 1:
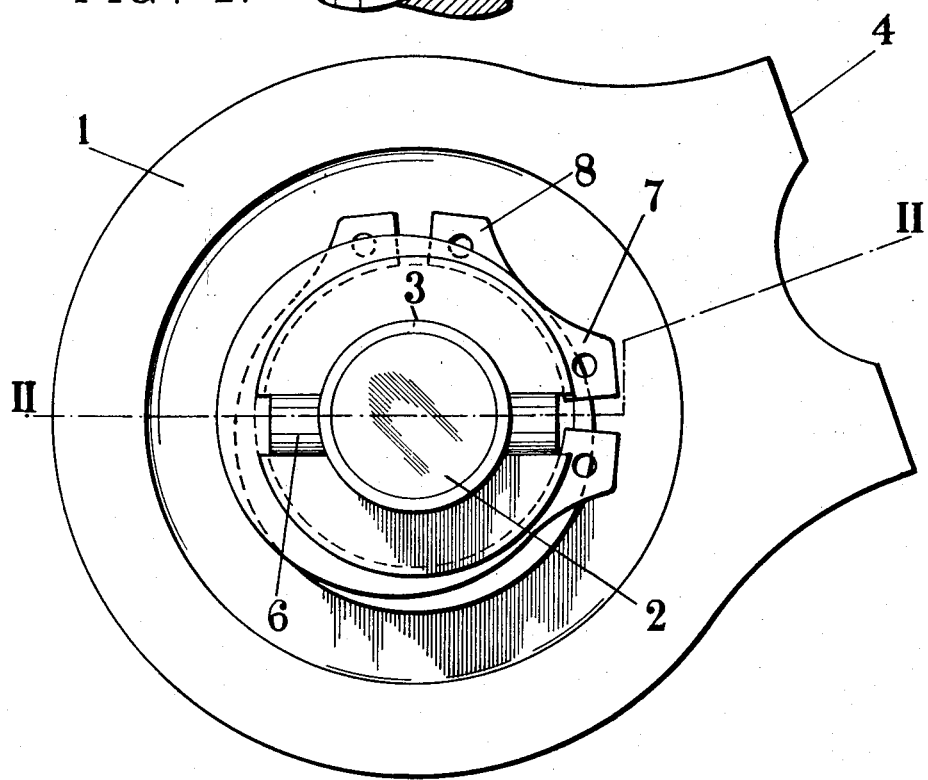

Referring to the accompanying drawing,
FIGURE 1 is a plan view of an arrangement in accordance with the invention.
FIGURE 2 is a section on line 11—11 of FIGURE 1.

The device is shown as applied to locating a collar 1 on a valve stem 2, the collar 1 being threaded on to a screw thread 3 at the end of the stem 2. The collar 1 has at one side projecting parts 4 for engaging a suitable guide surface on the engine to prevent rotation of the valve. The collar 1 has a boss 5 on the side nearer the end of the stem 2, and slots are formed in the boss 5, slightly offset from a diameter thereof, to take the ends of a solid pin 6 which passes through a transverse hole in the stem 2, which hole is correspondingly offset from a diameter of the stem. This arrangement ensures that the collar can be assembled on the stem only in one angular location. The pin 6 is retained in position by two circlips 7, 8 which are sprung into a circumferential groove around the boss 5.

What is claimed is:
In combination, a valve stem, a collar mounted on the valve stem, a parallel pin passing through a fitting hole in the valve stem offset from the centre line thereof and having ends projecting from the stem, a boss on the face of the collar having slots in which the projecting ends of the pin engage and having a circumferential groove intersecting the slots, and at least one spring ring sprung into the groove for retaining the pin in position.

References Cited in the file of this patent
UNITED STATES PATENTS

| | | |
|---|---|---|
| 710,795 | Moser | Oct. 7, 1902 |
| 1,615,251 | Woods | Jan. 25, 1927 |
| 2,162,772 | Blum | June 20, 1939 |
| 2,369,410 | Rossmann | Feb. 13, 1945 |
| 2,514,242 | Huus | July 4, 1950 |